(12) United States Patent
Hirth et al.

(10) Patent No.: US 11,498,028 B2
(45) Date of Patent: Nov. 15, 2022

(54) DEVICE FOR TREATING EXHAUST GASES

(71) Applicant: Vitesco Technologies GMBH, Hannover (DE)

(72) Inventors: Peter Hirth, Rösrath (DE); Florian Rings, Lohmar (DE)

(73) Assignee: Vitesco Technologies GMBH, Hannover (DE)

( * ) Notice: Subject to any disclaimer, the term of this patent is extended or adjusted under 35 U.S.C. 154(b) by 0 days.

(21) Appl. No.: 17/227,664

(22) Filed: Apr. 12, 2021

(65) Prior Publication Data
US 2021/0229036 A1    Jul. 29, 2021

Related U.S. Application Data

(63) Continuation of application No. PCT/EP2019/077571, filed on Oct. 11, 2019.

(30) Foreign Application Priority Data

Oct. 11, 2018   (DE) ...................... 10 2018 217 437.7

(51) Int. Cl.
*F01N 3/20* (2006.01)
*B01D 53/94* (2006.01)
*H05B 3/50* (2006.01)

(52) U.S. Cl.
CPC ............... *B01D 53/94* (2013.01); *H05B 3/50* (2013.01); *H05B 2203/011* (2013.01); *H05B 2203/024* (2013.01)

(58) Field of Classification Search
CPC ............... H05B 3/50; H05B 2203/011; H05B 2203/024; F01N 2330/02; F01N 13/1872; F01N 3/281; F01N 2240/16; F01N 3/2026

USPC ......................................................... 422/174
See application file for complete search history.

(56) References Cited

U.S. PATENT DOCUMENTS

| | | | |
|---|---|---|---|
| 5,149,508 A * | 9/1992 | Bullock | F01N 13/0097 422/174 |
| 5,411,711 A * | 5/1995 | Swars | B01J 35/0033 422/177 |
| 5,433,926 A | 7/1995 | Swars | |
| 5,670,746 A | 9/1997 | Hashimoto et al. | |
| 6,025,578 A | 2/2000 | Brueck | |
| 8,668,876 B2 | 3/2014 | Bruck et al. | |

(Continued)

FOREIGN PATENT DOCUMENTS

| CN | 104975915 A | 10/2015 |
|---|---|---|
| DE | 8905073 U1 | 8/1990 |

(Continued)

OTHER PUBLICATIONS

International Search Report and Written Opinion dated Jan. 27, 2020 from corresponding International Patent Application No. PCT/EP2019/077571.

(Continued)

*Primary Examiner* — Tom P Duong (57) ABSTRACT

A device for treating exhaust gases which has an outer wall which has an opening in order to electrically contact one or more conductor tracks, which are arranged within an interior space that is surrounded by the outer wall, through the outer wall. The opening is arranged in a projection which protrudes outward from the interior space and is integrally formed with the outer wall.

9 Claims, 3 Drawing Sheets

(56) References Cited

U.S. PATENT DOCUMENTS

| | | |
|---|---|---|
| 9,049,750 B2 | 6/2015 | Ishihara et al. |
| 9,815,024 B2 | 11/2017 | Kasahara et al. |
| 2016/0032806 A1 | 2/2016 | Sugiyama |

FOREIGN PATENT DOCUMENTS

| | | |
|---|---|---|
| DE | 4243904 A1 | 6/1994 |
| DE | 4307431 A1 | 9/1994 |
| DE | 19533088 A1 | 3/1997 |
| DE | 102015111913 A1 | 2/2016 |
| EP | 2175115 A1 | 4/2010 |
| JP | H06341316 A | 2/1994 |
| JP | H0842338 A | 2/1996 |
| JP | 2013181413 A | 9/2013 |
| JP | 2013198887 A | 10/2013 |
| WO | 9202714 A1 | 2/1992 |
| WO | 2012069355 A1 | 5/2012 |

OTHER PUBLICATIONS

Chinese Office Action dated Jan. 20, 2022 for corresponding Chinese application No. 201980066536.4.
Japanese Office Action dated May 16, 2022 for corresponding Japanese patent application No. 2021-519780.

* cited by examiner

DEVICE FOR TREATING EXHAUST GASES

CROSS-REFERENCE TO RELATED APPLICATIONS

This application claims priority to PCT Application PCT/EP2019/077571, filed Oct. 11, 2019, which claims priority to German Patent Application No. DE 10 2018 217 437.7, filed Oct. 11, 2018. The disclosures of the above applications are incorporated herein by reference.

FIELD OF THE INVENTION

The present invention relates to a device for treating exhaust gases which has an outer wall which has an opening in order to electrically contact one or more conductor tracks, which are arranged within an interior space that is surrounded by the outer wall, through the outer wall.

BACKGROUND OF THE INVENTION

Devices of this kind are known in principle, for example from EP 2 175 115 A1. The device for treating exhaust gases disclosed there has a sensor film which is embodied with a conductor element. A housing of the device has an opening for contacting the conductor element. In embodiments, provision is made to use the opening for contacting a plurality of conductor elements. The device has, on an outer surface of the housing, a metal sleeve which is arranged around the opening, for example with a gas-tight weld seam. The sleeve can be lined with an insulation on the inside and securely receive an electrode for contacting the conductor element. The intention is therefore also in particular to ensure that no exhaust gas passes through the sleeve to the outside.

The prior art likewise discloses electrically heatable catalytic converters which have metallic sheet layers which are attached to a supporting substrate in an electrically insulated manner.

Electrically heatable carrier substrates which are embodied as an insulated heating conductor at the end sides of a honeycomb body of the device, which honeycomb body is arranged in the interior space, are also known.

A further known way of heating a substrate involves providing as large a portion of an inner catalytic converter surface as possible by means of conductor tracks which are applied to a smooth/corrugated layer of the device. Almost the entire carrier volume can be electrically heated by means of the conductor tracks.

Some problems can be observed in the case of conventional heatable catalytic converters. For example, the entire catalytic converter surface may not be heated in some cases. For 48-volt applications, resistances that are higher than usual are sometimes required and sometimes these cannot be technically implemented in the case of small substrate sizes since a minimum material length of the substrate has to be available.

Furthermore, problems may arise when inserting an insulated heating conductor. Since the heating conductor is insulated, temperature distribution may be relatively poor. In addition, closed cells may occur in the region of the heating conductor or an increased counterpressure may also occur.

Finally, problems may also arise when heating relatively large catalytic converter surfaces. Electrical contacting by way of leading out each individual conductor track of heating elements through the outer wall of the device may be very complicated. Furthermore, a thermomechanically stable carrier film coating is often associated with a great degree of process complexity. The leaktightness of the device, for example with respect to escaping exhaust gases, can likewise be adversely affected by leading out the large number of individual electrical contacts.

SUMMARY OF THE INVENTION

An object of the invention is to provide a device for treating exhaust gases which is improved over the prior art. The intention is to improve the leaktightness of the device.

The object of the invention is achieved by the device for treating exhaust gases of the kind mentioned at the outset, in which the opening is arranged in a projection which protrudes outward from the interior space and is integrally formed with the outer wall.

With this solution a weld seam known from the prior art between the outer wall and the metal sleeve which is separate from it is dispensed with. The weld seam may constitute, for example, a potential leakage point for exhaust gases to the outside. Owing to the integrally formed projection, which replaces the sleeve, the separate sleeve and therefore the weld seam between the sleeve and the outer wall are superfluous. In this way, components, production steps and therefore also production costs may also be saved.

Various embodiments of the invention are described herein.

In an embodiment, the projection is formed as a bead in the outer wall. A bead is incorporated into the outer wall in a simple manner, if the outer wall is of circular-cylindrical shape. The bead may have a width and a depth which permit convenient contacting of the conductor or conductors or semiconductor or semiconductors through the opening. The opening is arranged on a top side of the bead, but the opening may alternatively be arranged in a side wall of the bead in other embodiments. The opening is embodied as a bore. The opening serves to contact a positive pole of one or more of the conductor tracks. However, in some embodiments, the opening serves to contact both the positive pole and also the negative pole of one or more of the conductor tracks. The bead has a top wall which connects the side walls and runs parallel to sections of the outer wall which adjoin the two side walls. In an embodiment, the side walls run substantially perpendicularly to the top wall. In an embodiment, the opening is formed in the top wall.

The projection, which in an embedment is the bead, forms a cavity between the outer wall and a conductor track carrier within the interior space. The bead has two parallel side walls. In an embodiment, the conductor track carrier is a film. The cavity is formed in the interior space and is delimited by the side walls and the top wall of the bead and by the conductor track carrier. A cavity of this kind creates installation space for conveniently electrically contacting the conductor tracks.

In the cavity, an electrode is arranged between the opening and the conductor track carrier in order to contact the one or the plurality of conductor tracks. Therefore, the installation space which is created by the cavity is used. In an embodiment, one or more electrodes which are electrically contacted through the outer wall are provided in the interior space, in the cavity, each of which electrodes electrically contacts two or more of the conductor tracks in the interior space.

If a plurality of electrodes are provided, two or more of the electrodes are electrically contacted through the same opening in the outer wall, wherein the opening is arranged radially in the outer wall above a region of the interior space in which the conductor tracks may be contacted. Therefore, the number of openings is reduced, and this has positive effect on the leaktightness of the device and on the production costs. However, in other embodiments, a separate opening is provided for each electrode for the purpose of electrically contacting the plurality of electrodes, so that each electrode may then be electrically contacted through the outer wall through an opening which is associated with the electrode.

The electrode is designed such that a cross section of the electrode, that is to say a material thickness, is adapted in connection with the ends of the one or the plurality of conductor tracks. This ensures a constant current density within the electrode. Otherwise, a decreasing/increasing current density may lead to undesired cold/hot spots. The required change in the material thickness is dependent on a current consumption of the respective conductor track. Therefore, the cross section of the electrode varies in sections depending on the current consumption of the conductor track respectively contacted there. In the radial direction of the outer wall, the electrode has a thickness which is matched to the expected current flow. In some embodiments, the electrode is thicker by more than a factor of 2, in other embodiments, is thicker by more than a factor of 3, in other embodiments, is thicker by more than a factor of 4, and yet in other embodiments, is thicker by more than a factor of 5, at its thickest point than at the thinnest point. Therefore, a substantially larger current flow is managed at the thickest point than at the thinnest point, without a significant temperature difference occurring.

In an embodiment, the electrode is designed as a busbar which extends along at least one section of the outer wall in order to contact a plurality of the conductor tracks. Therefore, a large number of conductor tracks is contacted by a single electrode, so that a separate electrode is not required for each conductor track. In some embodiments, the electrode is designed as a strip-like busbar. The busbar extends along at least one section of the projection of the bead. If the electrode is designed as a busbar, a plurality of conductor tracks is easily electrically contacted via the electrode in a simple manner because the electrode provides enough space for this along its direction of extent. The electrode may therefore be embodied as a busbar when a plurality of conductor tracks are intended to be contacted by the electrode. The busbar is bent with the same bending radius as the outer wall, so that the strip is designed to follow the outer wall in the interior space substantially at a constant distance in a circumferential direction. A passage area of the opening is greater than an areal extent of the electrode with respect to an area which faces the interior space. In an embodiment, the extent of the opening in the circumferential direction of the outer wall is greater than a length of the electrode in its direction of extent, if the electrode is embodied as a busbar. Therefore, the electrode is easily inserted into the interior space through the opening.

In alternative embodiments, the electrode is embodied as a cable arrangement which has an input-end conductor for electrical contacting through the outer wall and a large number of output-end conductors for electrically contacting a plurality of the conductor tracks in the interior space. The cable arrangement therefore branches the input-end conductor to the plurality of output-end conductors. In an embodiment, there are just as many output-end conductors as there are conductor tracks to be electrically contacted in the interior space.

In an embodiment, the length of the electrode is greater than or equal to half a radial circumference of the outer wall if the outer wall is of circular-cylindrical shape. In an embodiment the minimum length of the electrode is $L_{min}=0.5*\pi*D$, where D represents the diameter of the circular-cylindrical outer wall. In an embodiment, the electrode is formed from an electrically conductive material which has a resistivity p which lies between 0 and 3 (Ohm*mm$^2$)/m. ρ an in an embodiment is ≤1.5 (Ohm*mm$^2$)/m. Therefore, good electrical conductivity of the electrode is achieved.

In an embodiment, the electrode is fastened to the outer wall by one or more electrically insulating supports. In some embodiments, the electrically insulating supports are embodied as support pins. In some embodiments, the electrically insulating supports are embodied as an electrically insulated solder connection to the outer wall between the electrode and the outer wall. In an embodiment, the support is embodied as a support pin. A plurality of support pins, which are arranged at the same distance from one another along a direction of extent of the electrode, and in some examples, two to eight support pins, and in other examples, five, may be provided. In an embodiment, the support pin has two pin portions which are electrically insulated from one another. In an embodiment, a first pin portion is coaxially fixedly received in the second pin portion and insulation material for electrical insulation is inserted between the two pin portions. The first pin portion is then fastened to the outer wall and the second pin portion is fastened to the electrode, or vice versa. Therefore, a stable mechanical connection between the electrode and the outer wall is achieved and undesired electrical contacting between the electrode and the outer wall is prevented. In alternative embodiments, one or more of the electrically insulating supports is/are respectively not embodied as a support pin, but rather as an electrically insulated solder connection to the outer wall, between the electrode and the outer wall. Some embodiments make provision for one or more of the electrically insulating supports to be embodied as a support pin and at the same time for one or more further electrically insulating supports to be embodied as an electrically insulated solder connection to the outer wall, between the electrode and the outer wall.

In some embodiments, a plurality of electrically conductive contact regions are provided next to one another on the electrode. In an embodiment, in each case one of the contact regions is associated with in each case one of a plurality of conductor tracks for electrical contacting. An insulating region is respectively interposed between the plurality of contact regions on the electrode. This makes it possible to limit electrical contacting only to the contact regions and to place contact areas of the conductor tracks in the interior space in a manner bearing or abutting areally against the contact regions of the electrode. Other elements in the interior space may then bear or butt areally against the insulating regions of the electrode, without being electrically contacted by the electrode from outside the device. This allows a compact construction of the device. In an embodiment, the electrode is embodied as a busbar and rectangular contact regions alternate with rectangular insulating regions along the direction of extent of the busbar. It is expedient to provide just as many contact regions as conductor tracks to be contacted.

In embodiments, wound smooth layers, which alternate with wound corrugated layers, are arranged in the interior space in a known manner. At least one of the smooth layers is the conductor track carrier. In an embodiment, at least two of the smooth layers are the conductor track carriers and each carry a conductor track that is to be contacted. In order to achieve the desired electrical contacting of the conductor tracks and to avoid undesired electrical contacting of the corrugated layers, the smooth layers and the corrugated layers are arranged such that only the non-insulated contact areas of the smooth layers are in contact with the electrically conductive contact regions of the electrode. All of the elements in the interior space that are not to be electrically contacted are then in contact at most with the insulating regions of the electrode, so that undesired electrical contacting is avoided.

In an embodiment, precisely one electrical bushing passes through the opening and is electrically connected to the electrode. The electrical bushing is arranged to electrically contact the electrode from outside the outer wall through the opening. In other words, precisely one electrical bushing is electrically connected to all of the conductor tracks to be contacted via the electrode. Therefore, the connection complexity to outside the outer wall is reduced because a single bushing electrically contacts a plurality of conductor tracks via the electrode. In an embodiment, the electrical bushing is a bolt, such as a cylindrical bolt. In an embodiment, the electrical bushing has a diameter of 3-15 mm, an in another embodiment, the electrical bushing has a diameter of 8 mm. The electrical bushing is designed to conduct a current of between 10-500 amperes, and in an embodiment, is more than 200 amperes and/or equal to or less than 350 amperes, without heating up to a noticeable extent. The electrical bushing includes a bushing conductor, a bushing sleeve and a bushing insulation which electrically insulates the bushing sleeve from the bushing conductor. The bushing insulation radially surrounds the bushing conductor and has a thickness of 0.5-1.5 mm. The diameter of the electrical bushing corresponds substantially to a diameter of the opening, so that the electrical bushing is inserted into the opening with an accurate fit.

In embodiments, precisely two electrical bushings pass through the opening, wherein one of the electrical bushings is the electrical bushing that contacts the electrode and the other is a further electrical bushing which contacts a further electrode. The electrode electrically contacts the positive pole of the conductor track. The further electrode electrically contacts the negative pole of the conductor track.

In some embodiments which have a plurality of electrodes, such as the electrode and the further electrode, provision is made, for contacting each electrode, for in each case precisely one electrical bushing to pass through the outer wall and to be electrically connected to the respectively associated electrode in order to electrically contact the respectively associated electrode through the outer wall. Therefore, precisely one electrical bushing for each electrode is sufficient for electrical contacting, so that the number of electrical bushings through the outer wall is reduced.

The projection receives a layer stack, between the outer wall and the conductor track carrier, which in some examples is in the cavity. The electrode is arranged in the layer stack. In an embodiment, the electrical bushing penetrates the layer stack to a penetration depth in order to electrically contact the electrode.

An electrically insulating insulation layer is fitted in the cavity, as a constituent part of the layer stack adjoining the outer wall. The insulation layer is applied by one of the group consisting of CVD/PVD coating, aerosol deposition and flame spraying or a further suitable coating method. The insulation layer has a thickness which is matched to an expected maximum voltage that is to be contacted in order to form a suitable insulation resistance. A metallization layer is applied adjoining the insulation layer, and in an embodiment is by vapor deposition of a thin layer. A first solder layer is fitted adjoining the metallization layer. The electrode is fitted adjoining the first solder layer. In embodiments, the electrode is applied by screen printing or the like. A second solder layer is fitted adjoining the electrode, adjoining each contact region. The second solder layer furthermore adjoins the conductor track that is to be electrically contacted, which conductor track is fitted to the conductor track carrier. In an embodiment, the layer stack is therefore formed, in a sequence starting from the outer wall toward the conductor track carrier, of the insulation layer, the metallization layer, the first solder layer, the electrode and the second solder layer.

In an embodiment, the electrode is connected in a materially bonded manner to the metallization layer via the first solder layer and/or to the conductor track via the second solder layer, which may be by hard-soldering, such by a soldering agent, which is an embodiment is a nickel-, iron-, silver- or platinum-based solder or the like.

The layer stack has a cutout, which partially extends into the layer stack, for the electrical bushing to the penetration depth, so that the electrical bushing electrically contacts the first solder layer in order to electrically contact the electrode that is electrically contacted with the first solder layer. In some embodiments, the cutout therefore passes through the insulation layer and the metallization layer. The insulation layer and the metallization layer therefore radially surround the electrical bushing, while the electrical bushing axially butts against the first solder layer by way of one end of the electrical bushing. A connection to a power source, for example a cable or a terminal, may be provided on the electrical bushing at a further end which is situated opposite the first-mentioned end and protrudes out of the outer wall.

In an embodiment, the device is designed for electrically contacting the first pole of the conductor track in the interior space through the opening. The device has, in the outer wall, a further projection with the further opening in order to electrically contact the second pole of the conductor track in the interior space. The further opening is arranged in a further projection which protrudes radially outward and is integrally formed with the outer wall. The further projection is designed as a further bead and designed according to one of the embodiments of the above-described bead. The first pole is the first pole of the conductor track which is arranged on the smooth layer which in an embodiment is a conductor track carrier. The second pole is the second pole of the conductor track which is arranged on the smooth layer. In an embodiment, the first pole is the positive pole. The second pole in an embodiment is the negative pole. The second pole may alternatively also be electrically contacted via the outer wall, also called the device jacket. The termination of the smooth layer is then provided with solder for hard-soldering, which is suitable for connecting the conductor track and the outer wall to one another in a materially bonded manner, for contacting the negative pole. Therefore, a fixed contact between the outer wall and the negative pole of the conductor track is ensured. Some embodiments make provision for the electrode to contact the first pole. Some embodiments make provision for a further electrode, which is designed like embodiments of the electrode, to contact the second pole.

In an embodiment, the device has the electrode and the further electrode in the interior space and is designed for electrically contacting the electrode through the outer wall in order to electrically contact in each case a first pole of two or more of the conductor tracks and is designed for electrically contacting the further electrode through the outer wall in order to electrically contact in each case a second pole of the two or more of the conductor tracks. The electrode is received in the projection and the further electrode is received in the further projection. In some embodiments, the electrode and the further electrode are received in a common projection and/or are electrically contacted through the same opening in the outer wall. A positive electrical bushing electrically contacts the electrode. In an embodiment, a negative electrical bushing electrically contacts the further electrode.

In an embodiment, the electrode and the further electrode are arranged parallel to one another in the interior space and extend at a substantially constant distance from the outer wall. Therefore, the first pole and the second pole may each be electrically contacted immediately next to one another in a very compact manner.

In an embodiment, the device has, in the interior space, one or more of the conductor track carriers which each carry one of the conductor tracks. In each case one of the conductor tracks is arranged on a surface of a respective conductor track carrier and an electrically insulating insulation coating, which is interrupted on a contact area of the conductor track for electrically contacting the conductor track in order to electrically contact the conductor track through the outer wall, is formed on the surface and the conductor track. In an embodiment, the insulation coating also extends between the surface of the conductor track carrier and the conductor track in order to electrically insulate the conductor track carrier from the conductor track.

At least one of the conductor tracks is designed for operating a heater which is arranged in the interior space. The heater is the conductor track which is arranged on the smooth layer. In an embodiment, the conductor track on the smooth layer is coated with the electrically insulating insulation coating, wherein a cutout is provided in the insulation coating in order to expose the contact area of the conductor track at which the conductor track is electrically contacted by the electrode. A separate cutout is provided for each contact area of the conductor track, such as for each pole of the conductor track. The cutouts are arranged adjacent to ends of the smooth layer since the ends generally constitute terminations of the smooth layers which bear against the electrode in the assembled state. The conductor track, as a heater, runs in a meandering manner or in a zigzag manner over the conductor track carrier. A gap, which is additionally free of the conductor track and which likewise serves for insulation, is provided between the ends of the insulation coating and the ends of the conductor track carrier, which in some examples is the film of the smooth layer. The region of the gap at an end side of the film, is usually arranged in order to butt against the outer wall of the device from the inside in the assembled state. Therefore, an electrical short circuit of the conductor track carrier with the electrode or else with an inner side of the outer wall is prevented.

In various embodiments, the device is a catalytic converter, which is an embodiment is a catalytic converter which is areally heated. In these embodiments, a large number of heating devices, which are embodied as conductor tracks on the conductor track carriers, which in some embodiments are the smooth layers, often have to be electrically contacted from outside the device through the outer wall. The present invention may therefore have the effect that the sealing is improved or simplified.

In an embodiment, a plurality of conductor track carriers, such as a plurality of films, and in some examples is a plurality of smooth layers and/or a plurality of corrugated layers, form a layer package in the interior space. In an embodiment, the conductor track carriers are arranged in a wound arrangement in the interior space. In an embodiment, smooth layers and corrugated layers are arranged alternately and respectively adjacent smooth layers and corrugated layers are in contact. The layer package is wound in a known S-shape and the layer package is received in the interior space in such a way that the direction of extent of a winding axis of the layer package corresponds to a direction of extent of the axial extent of the outer wall. In embodiments, the layer package may be tilted, so that it forms a parallelogram as seen from the end side. Therefore, in a non-rolled up and therefore flat form of the stacked layers of the layer package, the layers are shifted in parallel in relation to one another, so that the surface of the end side that is formed by the edges of the plurality of smooth layers and/or corrugated layers assumes the shape of a parallelogram. A length of the layer termination in the wound shape may then be shortened depending on an angle of tilt. This makes it possible to keep the contact areas of the conductor tracks and the associated contact regions of the electrode small or else to shorten the electrode, if the electrode is designed as a busbar. In some examples, the angle of tilt is greater than 15°, in other examples, is greater than 30°. In some embodiments, the angle of tilt is less than 90°, and in some embodiments, is less than 80°. The angle of tilt in some examples lies between 40° and 80°. Some angles of tilt may be 50° and 75°. The layer termination in some examples has a length of less than 180°, in other examples is less than 160°, in other examples is less than 120°, in yet other examples is less than 100°, and may be less than 90°, with respect to a radial circumference of a circular-cylindrical outer wall. Exemplary layer terminations have lengths of between 150° and 140°, and in some examples are approximately 141°, or of 110° to 100°, and may be approximately 106°, with respect to the radial circumference of the circular-cylindrical outer wall.

In some embodiments, the outer wall is also surrounded by a sealing wall which seals off the outer wall, which has the opening to the interior space, from the environment. In this closed sealing wall, bushing bores which are sealed off in a gas-tight manner are provided for the electrical bushings. Therefore, the opening may be of a size which, during production or maintenance, allows easy access to the interior space and, in spite of this, good leaktightness of the device is achieved.

One or more of the insulation layer, the insulating region and the insulation coating are formed from an electrically insulating material which is resistant to high temperatures, such as high temperatures up to a temperature of 1000° C. The material has an oxidic composition and in an embodiment is an aluminum oxide, a titanium oxide, a zirconium oxide or the like. In some examples, the material has a porosity of preferably <1%, and in some embodiments, a porosity of <0.1%, and may have a porosity of 0%. The material is provided with a thickness of between 100 nm and 10 μm. The thickness of one or more of the insulation layer, the insulating region and the insulation coating therefore lies between 100 nm and 10 μm. It goes without saying that the insulation layer, the insulating region and the insulation coating compared with one another do not all have to be formed from the same materials with respectively the same thicknesses and porosities and different materials may also be combined with one another within each of the insulation layer, the insulating region and the insulation coating, provided that the desired electrically insulating effect is achieved in each case.

In an embodiment, the device according to the invention is produced by the following steps: First, the projection, which in an embodiment is the bead, is formed in one piece with the outer wall and away from the interior space with a given width and depth for establishing contact. Then, the opening, which in an embodiment is the bore, is produced within the projection in order to be able to connect the electrical bushing to the electrode for contacting purposes, such as for contacting the positive pole. Then, the negative pole is selectively contacted either via the outer wall or an electrode which is embodied analogously to the positive pole, which in an embodiment is within a further bead. When contacting the negative pole via the outer wall, in an embodiment, the region of the layer termination of the negative pole is provided with solder for hard-soldering, which connects the conductor track and the outer wall to one another in a materially bonded manner. Then, the layer stack including the insulation layer, the metallization layer, and the electrode is applied within the projection. In this case, the layer thickness of the electrode is matched to the expected current flow. In addition, the layer thickness of the insulation layer is matched to the expected maximum voltage. Subsequently, the electrode is provided, in part, with insulation regions in order to prevent short circuits with possibly non-insulated layer ends or their end sides. As an alternative to this, an insulation, such as a ceramic insulation, may be applied to the layer ends or end sides of the layers or a narrow gap may be applied on the layer rear side in the region of the contacting point. In this case, the insulated conductor track carrier in the film termination is longer than the non-insulated corrugated layer, wherein, however, the film termination normally alternates by the same layer length. Then, the second solder layer is applied to the contact regions of the electrode. Finally, a corresponding matrix, which is provided with conductor tracks, is pressed in.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Exemplary embodiments of the invention, to which the invention is not limited however, will be described below with reference to the appended schematic Figures, in which.

DETAILED DESCRIPTION OF THE PREFERRED EMBODIMENTS

The following description of the preferred embodiment(s) is merely exemplary in nature and is in no way intended to limit the invention, its application, or uses.

Reference signs have been inserted in the following detailed description of embodiments, which relates to the appended Figures, in order to improve readability. The reference signs are not intended to have any limiting effect. Furthermore, all features which are mentioned in the general part of the description and in the following detailed description may also be combined with one another between the illustrative, exemplary embodiments in order to form new exemplary embodiments according to the invention, provided that the combined features are not technically mutually exclusive or the combination of the features is not explicitly excluded.

Figure 1:
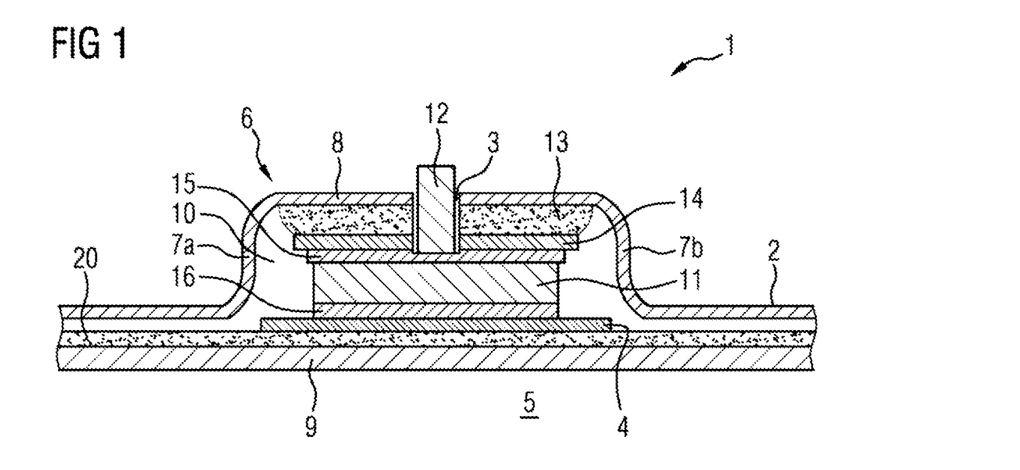
FIG. 1 shows a cross section through a first embodiment of the device according to the invention.

FIG. 1 shows a cross section through a first embodiment of the device 1 according to the invention. The device 1 is a device for treating exhaust gases, here more precisely an areally heatable catalytic converter, as will become clearer below.

The device 1 has an outer wall 2. The outer wall 2 has an opening 3 in order to electrically contact a conductor track 4, which is arranged within an interior space 5 that is surrounded by the outer wall 2, through the outer wall 2. In the present exemplary embodiment, the outer wall 2 is of circular-cylindrical shape, wherein the circular-cylindrical curvature of the outer wall 2 is not illustrated in FIG. 1 for reasons of simplicity. An axis of symmetry of the circular-cylindrical outer wall 2 runs along the viewing direction of the illustration in FIG. 1.

The opening 3 is arranged in a projection 6 which protrudes outward from the interior space 5 and is integrally formed with the outer wall 2. Therefore, the projection 6 may replace a separate, welded-on sleeve, as is known from the prior art. More precisely, the projection 6 is formed as a bead in the outer wall 2. The viewing direction in FIG. 1 is along a longitudinal direction of extent of the bead. The bead therefore extends in the circumferential direction around the outer wall 2. The bead is formed by two parallel side walls 7a, 7b and a top wall 8 which is oriented substantially perpendicularly thereto and connects the two side walls 7a, 7b to one another. The top wall 8 runs parallel to the rest of the outer wall 2 which laterally adjoins the side walls 7a, 7b. The two side walls 7a, 7b run substantially perpendicularly to the top wall 8. The opening 3 is formed centrally in the top wall 8 as a bore.

The projection forms a cavity 10 between the outer wall 2 and a conductor track carrier 9, which carries the conductor track 4, within the interior space 4. The cavity 10 is located, more precisely, between the top wall 8, the two side walls 7a, 7b and the conductor track carrier 9. An electrode 11 is arranged between the opening 3 and the conductor track carrier 9 in the cavity 10 in order to contact the conductor track 4.

FIG. 1 shows that precisely one electrical bushing 12 passes through the opening 3 and is electrically connected to the electrode 11. The electrical bushing 12 is arranged to electrically contact the electrode 11 from outside the outer wall 2 through the opening 3. The projection 6 receives a layer stack, in this exemplary embodiment in the cavity 10. The electrode 11 is arranged in the layer stack. The electrical bushing 12 penetrates the layer stack to a penetration depth in order to electrically contact the electrode 11.

The layer stack consists of, starting at the top wall 8, an insulation layer 13 for electrically insulating the outer wall 2 from the electrode 11, a metallization layer 14, a first solder layer 15, the electrode 11 and a second solder layer 16. The electrical bushing 12 passes through the insulation layer 13 and the metallization layer 14 and is connected to the first solder layer 15 in a materially bonded manner. The first solder layer 15 is, in turn, electrically connected to the electrode 11 in a materially bonded manner. The second solder layer 16 electrically connects the electrode 11 to the conductor track 4 in a materially bonded manner, here more precisely to a first contact area 17 of the conductor track 4 shown in FIG. 4 and described more precisely below. The penetration depth therefore extends through the insulation layer 13 and the metallization layer 14 as far as the first solder layer 15. Therefore, the insulation layer 13 and the metallization layer 14 radially surround the electrical bushing 12.

Figure 2:
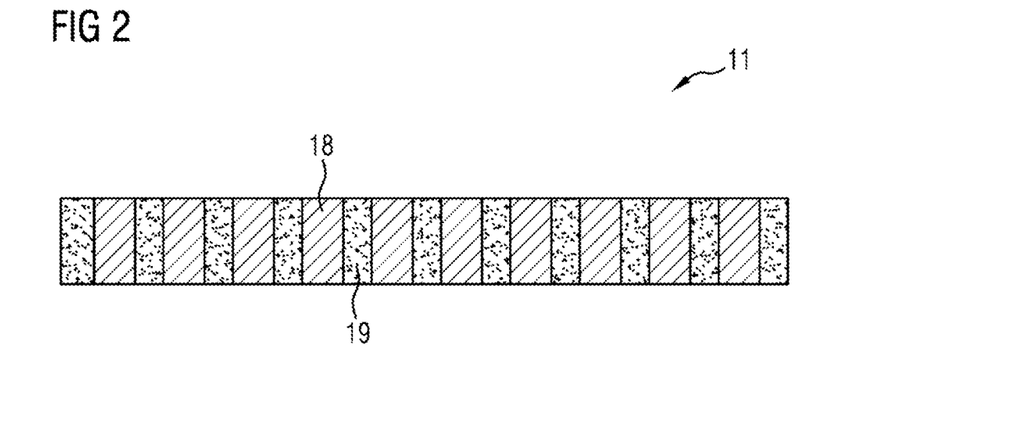
FIG. 2 shows a plan view of an electrode of the device according to the first embodiment.

FIG. 2 shows a plan view of the electrode 11 according to the first embodiment of the device 1. The plan view shows a side of the electrode 11 which faces the interior space 5. The electrode 11 is electrically contacted through the outer wall 2 on an opposite side which is averted from the interior space 5. The electrode 11 is designed as a busbar, in this example as a strip-like busbar. A plurality of contact regions 18 are provided on the electrode 11. A plurality of insulating regions 19 are provided on the electrode 11. The insulating regions 18 are arranged between the contact regions 18, so that in each case one contact region 18 alternates with an insulating region 19 along the electrode 11. Here, ten contact regions 18 are provided by way of example, and therefore ten conductor tracks 4 are contacted by the electrode 11. If more or fewer conductor tracks 4 are to be electrically contacted, more or fewer contact regions 18 may, however, also accordingly be provided. However, in an embodiment, precisely one contact region 18 is associated with each conductor track 4 and the number of contact regions 18 provided on the electrode 11 corresponds to the number of conductor tracks 4 to be electrically contacted. For reasons of simplicity, only one contact region 18 and only one insulating region 19, which is adjacent to the contact region 18, are provided with reference signs in FIG. 2.

Figure 3:
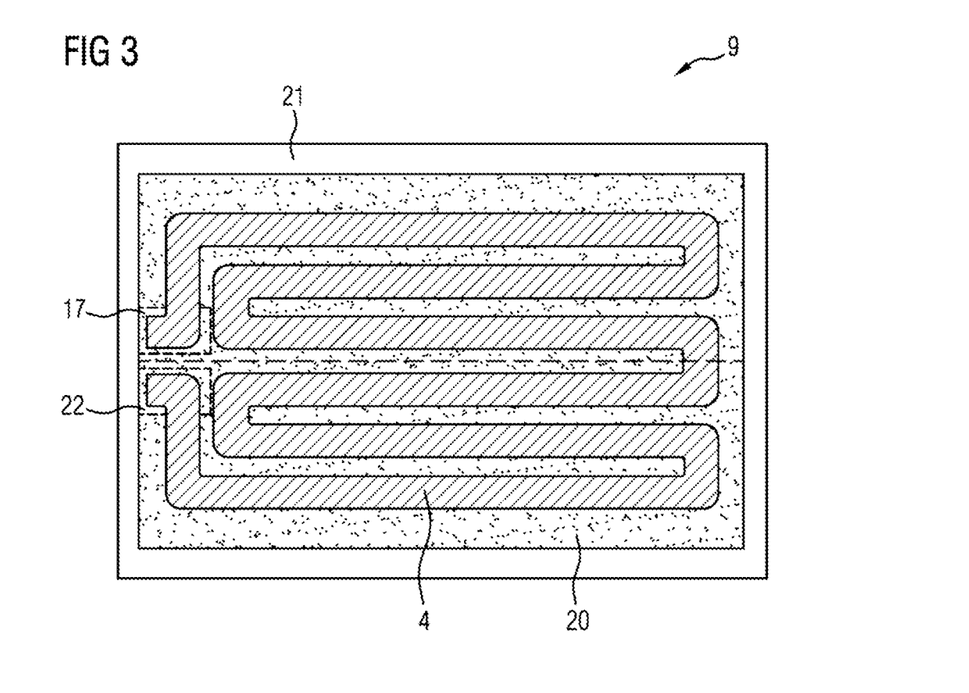
FIG. 3 shows a plan view of a conductor track on a conductor track carrier of the device according to the first embodiment.

FIG. 3 shows a plan view of a conductor track 4 on a conductor track carrier 9 of the device 1 according to the first embodiment. More precisely, FIG. 3 shows one of a plurality of conductor track carriers 9 which are installed in the device 1. The conductor track carrier 9 forms a smooth layer of the catalytic converter. A conductor track 4 is applied to the conductor track carrier 9 and runs in a meandering manner over the conductor track carrier. An insulation coating 20 is applied to the conductor track 4 and covers a large portion of the conductor track carrier 9. The insulation coating 20 also extends between the conductor track 4 and the conductor track carrier 9 in order to electrically insulate the conductor track carrier 9 from the conductor track 4. A gap 21 is left free between the edge of the insulation coating 20 and the edge of the conductor track carrier 9. Neither the insulation coating 20 nor the conductor track 4 are located in the gap 21. Therefore, the gap 21 may serve as additional electrical insulation, for example if the gap 21, in the state in which the conductor track carrier 9 is mounted in the device 1, butts for example against the electrode 11 or from the inside against the outer wall 2.

The first contact area 17 is formed at a first end region of the conductor track 4, which end region forms a positive pole of the conductor track 4. The first contact area 17 is formed by way of a first recess being formed in the insulation coating 20, the recess exposing the first end region of the conductor track 4. A second contact area 22 is formed at a second end region of the conductor track 4, which end region forms a negative pole of the conductor track 4. The second contact area 22 is formed by way of a second recess being formed in the insulation coating 20, the recess exposing the second end region. This ensures that electrical contacting of the conductor track 4 may take place only in the two end regions of the conductor track 4. One of the contact regions 18 of the electrode 11 is arranged for being in contact with the first contact area 17 in order to electrically connect the conductor track 4 through the opening 3 in the outer wall 2 via the electrical bushing 12. The device 1 is therefore designed for electrically contacting the first pole of the conductor track 4 in the interior space 5 through the opening 3. In an embodiment that is not shown, the device 1 has, in the outer wall 2, a further projection, such as a further bead, with a further opening in order to electrically contact the second pole of the conductor track 4 in the interior space 2. This second pole may then be electrically contacted, for example, via a further electrode in the further bead. A further layer stack, as described above, may be present in the further bead. In order to avoid repetition, reference is made to the above statements relating to the projection 6, the electrode 11 and the layer stack in respect of the further projection, the further electrode and the further layer stack. In an embodiment that is not shown, the further bead runs parallel to the bead along the circumferential direction of the outer wall 2 and/or the further electrode runs along the circumferential direction of the outer wall 2 parallel to the electrode 11.

The conductor track 4 shown in FIG. 3 is designed for operating a heater which is arranged in the interior space 2. More precisely, the conductor track 4 is the heater here and has an electrical resistor, which heats the conductor track carrier 9 as current flows through the conductor track 4, between the first pole and the second pole. The smooth layer is therefore areally heated. Therefore, the device 1 is an areally heatable catalytic converter.

Figure 4:
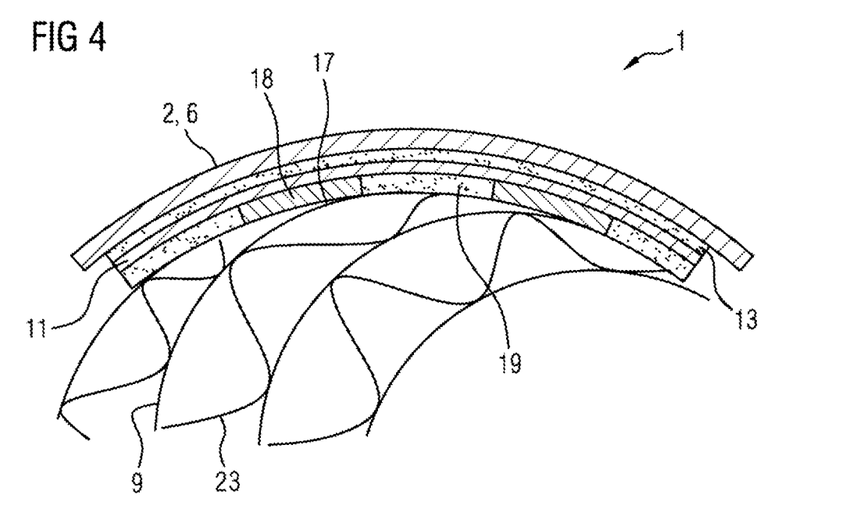
FIG. 4 shows a cross-sectional view along an axial viewing direction of the device according to the first embodiment.

FIG. 4 shows a cross-sectional view along an axial viewing direction of the device 1, along the axis of symmetry of the cylindrical outer wall 2. In this case, the cross section runs parallel to the two side walls 7a, 7b through the projection 6, but offset in relation to the electrical bushing 12, so that the electrical bushing cannot be seen in FIG. 4. The electrode 11 is embodied as a bent busbar which has a curvature which corresponds to a curvature of the outer wall 2. Therefore, the electrode 11 follows the outer wall 2 at a constant distance. The entire layer stack described above follows the profile of the outer wall 2 in an annular manner. The device 1 includes a large number of conductor track carriers 9 which are embodied as smooth layers here. The conductor track carriers 9 are arranged alternately with corrugated layers 23. In the exemplary embodiment shown in FIG. 4, the corrugated layers 23 do not carry any conductor tracks 4, but in other embodiments may also be conductor track carriers 9, in addition to the or instead of the smooth layers. By way of example, only in each case one conductor track carrier 9, that is to say a smooth layer, and a corrugated layer 23 adjoining it are identified by reference numerals. However, it is obvious that the wound layer package illustrated in sections has a large number of alternately arranged conductor track carriers 9 and corrugated layers 23. The first contact area 17 of each conductor track carrier 9 is in contact with in each case one of the contact regions 18 of the electrode 11. Insulated ends of termination regions of the conductor track carriers 9 and termination regions of the corrugated layers 23 are in contact with insulating regions 19 of the electrode 11. Electrical contacting therefore takes place only between the first contact areas 17 of the respective conductor tracks 4 and the associated contact regions 18 of the electrode 11. Although not shown in FIG. 4, it is easy to imagine that the electrical contacting of the second contact areas 22 shown in FIG. 3, that is to say the negative pole of the conductor track 4, takes place in a further bead parallel to the projection 6 that is embodied as a bead quite analogously to the illustration in FIG. 4 with respect to the first contact areas 17 of each conductor track 4. The further bead therefore runs, like the projection 6, in the circumferential direction of the outer wall 2 in an annular manner around the outer wall 2 and is likewise embodied in one piece with it, without the need for a connecting material, e.g. a weld seam, between the further bead and the outer wall 2.

Figure 5:
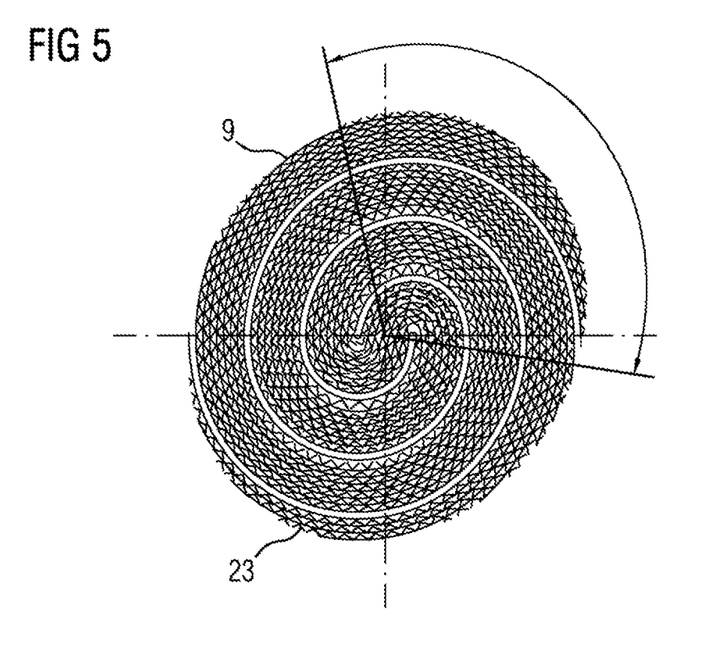
FIG. 5 shows a further cross-sectional view along the axial viewing direction of the device according to the first embodiment.

FIG. 5 shows a further cross-sectional view along the axial viewing direction of the device 1 according to the first embodiment. More precisely, FIG. 5 now shows the layer package of conductor track carriers 9 and corrugated layers 23 in an illustrative manner along a winding axis of the layer package. A winding of S-shape in accordance with FIG. 5 is used for the device illustrated in FIGS. 1-4. The direction of extent of the winding axis of the layer package corresponds to a direction of extent of the axial extent of the outer wall 2. The layer package is tilted so that, in the non-wound, flat state, it forms a parallelogram when viewed from the end side. The layers are therefore arranged in a manner displaced in relation to one another. A degree of displacement determines a length of a layer termination. Here, by way of example, the angle of tilt which is measured at the non-wound layer package is 75° and the length of the layer termination is 120.6 mm or, expressed as the radial circumferential angle of the outer wall 2, 106.3°. Therefore, the respective first contact areas 17 of the conductor tracks 9 and the associated contact regions 18 of the electrode 11 are kept small or else the length of the electrode 11 is kept short.

Figure 6:
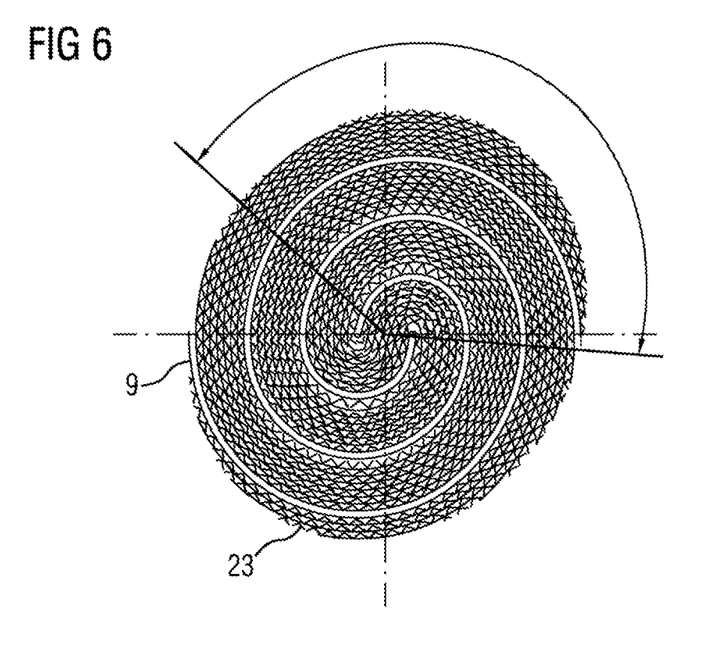
FIG. 6 shows a cross-sectional view along the axial viewing direction of the device according to a second embodiment.

FIG. 6 shows a cross-sectional view along the axial viewing direction of the device 1 according to a second embodiment. The Figure shows a layer package including conductor track carriers 9 and corrugated layers 23 which has an alternative angle of tilt illustrated along a winding axis of the layer package. The winding of S-shape according to FIG. 6 is used for some embodiments of the invention that are not shown. It then simply replaces the winding according to FIG. 5, with adjustment of the electrode 11 and further elements which are dependent on the length of the layer termination. The direction of extent of the winding axis of the layer package shown again corresponds to the direction of extent of the axial extent of the outer wall 2. The layer package is again tilted, so that, in the non-wound, flat state, it forms the parallelogram when viewed from the end side. The layers are therefore once again arranged in a manner displaced in relation to one another. Here, by way of example, the angle of tilt which is measured at the non-wound layer package is, however, 50° and the length of the layer termination is 160.7 mm or, expressed as the radial circumferential angle of the outer wall 2, 141.6°. Therefore, the layer termination is stretched over a greater distance, depending on the application. Further angles of tilt are possible, depending on the application.

The invention therefore allows areal heating elements, such as heating foils for example which have been inserted into a catalytic converter, to be contacted in a simplified manner. In an embodiment, conventionally electrically heatable catalytic converters which include metallic sheet layers which are arranged on a supporting substrate in an electrically insulated manner in embodiments that are not shown may be contacted in a comparable manner to the conductor tracks 4 shown. Therefore, both the positive and also the negative contacting point may be tapped off in the same radial position. The contacting of all contact areas 17, 22 of the conductor tracks 4 may therefore take place centrally by the electrode 11, for the positive poles, or the further electrode for the negative poles of the conductor tracks 4. This results in a simple, central electrical connection of the conductor tracks 4 by the electrical bushing 12, which in an embodiment is a catalytic converter which is areally heated by the conductor tracks 4. The result is increased accessibility and a smaller amount of required installation space.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A device for treating exhaust gases, comprising:
   an outer wall having an opening;
   a plurality of conductor tracks which are arranged within an interior space that is surrounded by the outer wall; and
   a projection which protrudes outward from the interior space and is integrally formed with the outer wall, and the opening is arranged in the projection;
   an electrode;
   a cavity formed by the projection between the outer wall and a conductor track carrier within the interior space and, in the cavity, the electrode is arranged between the opening and the conductor track carrier in order to electrically contact the one or the plurality of conductor tracks;
   wherein each of the plurality of conductor tracks is electrically contacted through the opening of the outer wall.

2. The device of claim 1, the projection further comprising a bead in the outer wall.

3. The device of claim 1, the electrode further comprising a busbar which extends along at least one portion of the outer wall in order to contact the one or more conductor tracks.

4. The device of claim 1, the device further comprising:
   a plurality of electrically conductive contact regions are provided next to one another on the electrode; and
   an insulating region interposed between the plurality of contact regions on the electrode;
   wherein each of the plurality of electrically conductive contact regions is in electrical contact with a corresponding one of the plurality of conductor tracks.

5. The device of claim 1, further comprising an electrical bushing which passes through the opening and is electrically connected to the electrode and is arranged for the electrode to be electrically contacted from outside the outer wall through the opening.

6. The device of claim 5, further comprising:
   a layer stack in which the electrode is arranged;
   wherein the projection receives the layer stack, and the electrical bushing penetrates the layer stack to a penetration depth in order to electrically contact the electrode.

7. The device of claim 1, further comprising:
   a first pole being part one of the plurality of conductor tracks;

a second pole being part one of the plurality of conductor tracks;

a second projection which protrudes outward from the interior space and is integrally formed with the outer wall, and a second opening is arranged in the projection;

wherein the first pole is electrically contacted in the interior space through the opening, and the second pole is electrically contacted in the interior space through the second opening.

8. The device claim 1, wherein at least one of the plurality of conductor tracks is designed to operate a heater which is arranged in the interior space.

9. The device of claim 1, the device further comprising a catalytic converter which is areally heated.

* * * * *